Sept. 15, 1959     A. L. JACKSON     2,904,281
SPINNING TYPE FISHING REEL
Filed Jan. 25, 1954     4 Sheets-Sheet 4
FIG.14
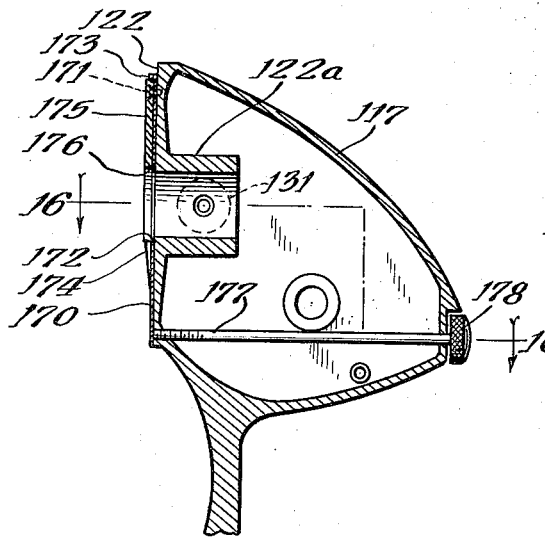
FIG.15
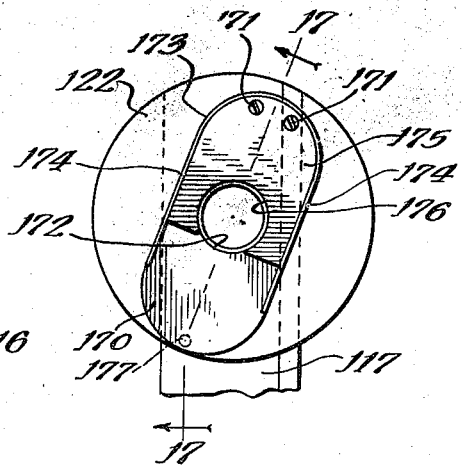
FIG.16
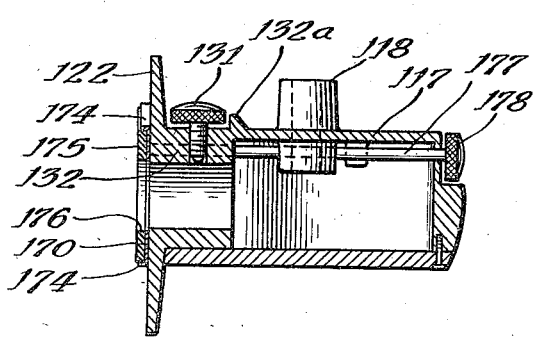
FIG.17
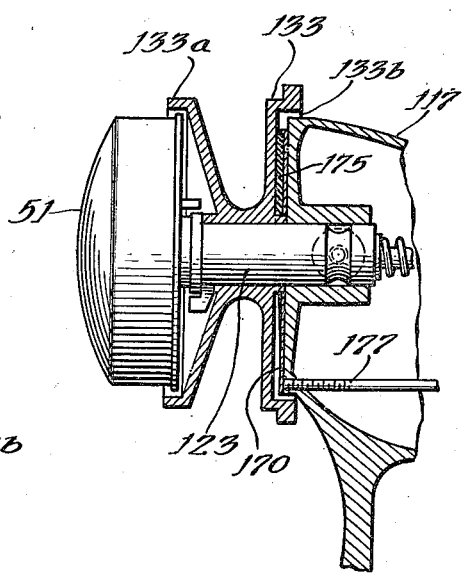
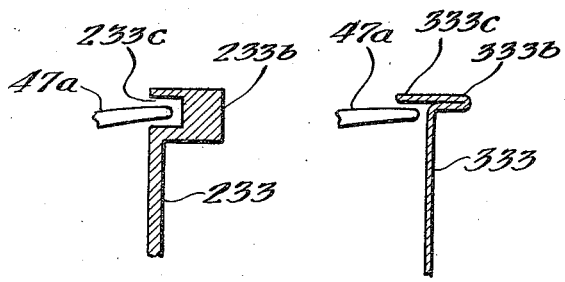
FIG.18     FIG.19
Inventor:
Aldrich L. Jackson
By: Schroeder, Hofgren,
Brady & Wegner
Attorneys

# United States Patent Office 2,904,281
Patented Sept. 15, 1959

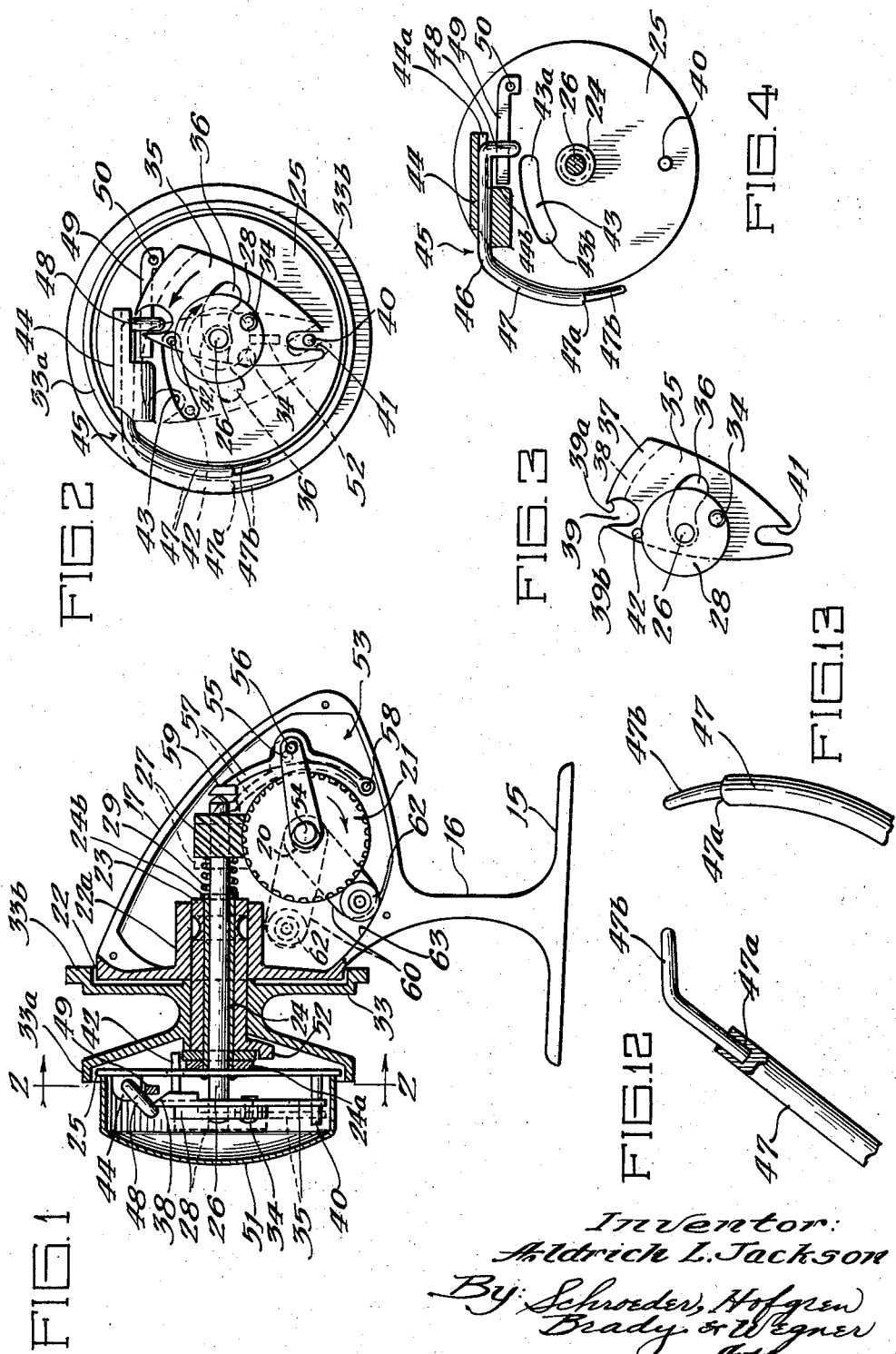

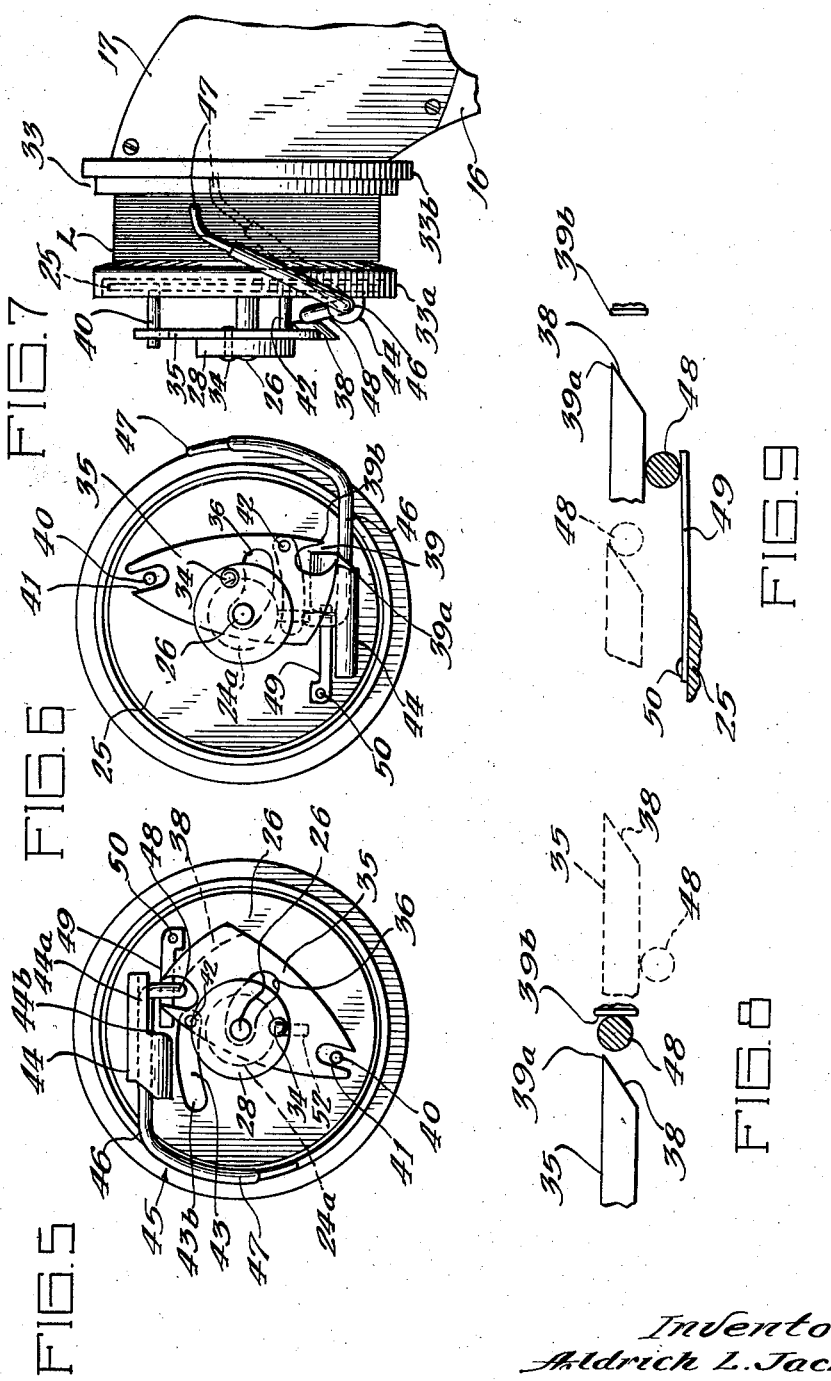

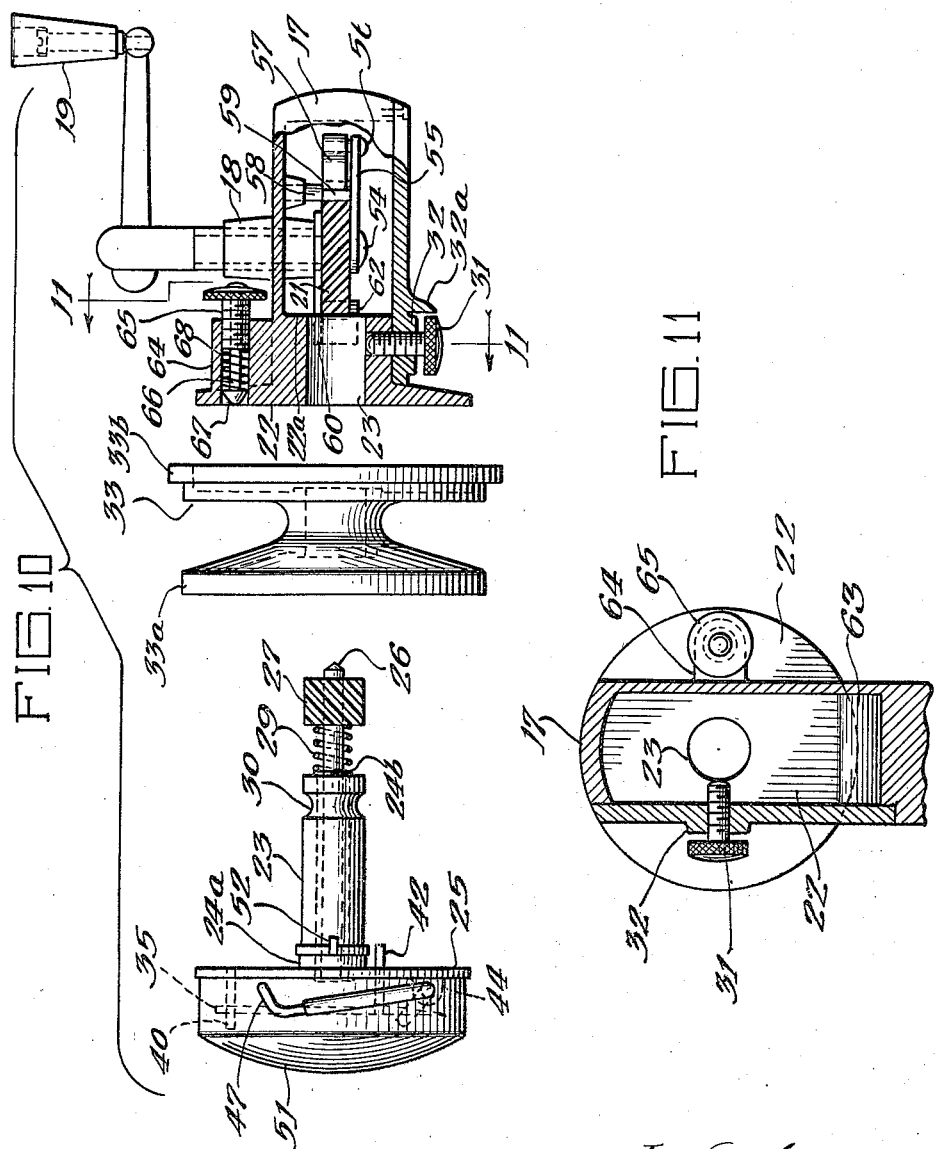

2,904,281

SPINNING TYPE FISHING REEL

Aldrich L. Jackson, Eustis, Fla.

Application January 25, 1954, Serial No. 405,930

17 Claims. (Cl. 242—84.21)

This invention relates to a spinning type fishing reel, and in particular it relates to a reel in which a line pick-up finger, which is retracted during a cast, is automatically moved into a line pick-up position above the reel spool when the crank is first turned to retrieve line.

Spinning type fishing reels are becoming increasingly popular because the line reels very freely off the spool during a cast, so that the cast may be made farther and with greater accuracy. This is the case because the reel has no parts in motion when a cast is being made. However, the main difficulty with spinning reels has been that they require a relatively large number of unaccustomed hand movements to place them in condition for action, so that the beginner was apt to be discouraged in his attempt to use them. The present invention is believed to make the operation of a spinning reel as nearly automatic as possible, eliminating any unusual manipulations.

In accordance with the present invention, a line pick-up finger is mounted on a carrier plate forward of the line carrying spool, and the pick-up finger is movable between a retracted position below the edge of the spool and a working position projecting over the spool. When line is being retrieved the pick-up finger oscillates back and forth across the spool, as it is carried around the spool on the carrier, and when it is desired to make a cast the person using the reel need only press his forefinger against a large cover on the carrier and turn the hand crank a few degrees in reverse which retracts the pick-up finger and moves the line into a position between the forefinger and the cover where it may be completely controlled by the forefinger, or the crank may be held still while the forefinger moves the cover slightly. The movement of the line into forefinger control is entirely automatic, and the angler need not look at the reel or finger.

When it is desired to retrieve line, the angler using the reel simply turns the crank in the customary fashion, and during the first part revolution of the carrier the pick-up finger is automatically moved into its operating position extending above the margin of the spool.

The principal object of the present invention, therefore, is to provide a spinning reel in which abnormal finger movements are eliminated to the greatest possible extent.

A further object is to provide a spinning reel in which forefinger pressure, combined with a reverse rotation of the reel crank for a part of a turn is all that is needed to retract the line pick-up finger and prepare to cast.

A further object is to provide a spinning reel in which the ordinary action of turning the hand crank to retrieve line automatically moves the line pick-up finger into retrieving position.

It is also desirable to be able to change spools of line so as to vary the weight of line used at various times, and a further object, therefore, is to provide a spinning reel in which the spool may be readily removed and exchanged.

A further object is to provide an automatic anti-reverse which sets when trolling due to the drag of the lure, or casting when a fish is taking out line.

The invention is illustrated in a preferred and an alternative embodiment in the accompanying drawings, in which:

Fig. 1 is a central vertical sectional view of a reel constructed in accordance with this invention;

Fig. 2 is a section taken as indicated along the line 2—2 of Fig. 1, the parts being shown in full line with the line pick-up member in retracted position and in broken line with said member in working position;

Fig. 3 is a front elevational view of the drive disc and actuator for moving the pick-up member;

Fig. 4 is a plan view of the carrier plate and pick-up member mounted thereon;

Fig. 5 is a view similar to Fig. 2, showing the pick-up member in retracted position;

Fig. 6 is a view similar to Fig. 5 but with the pick-up actuator and the pick-up member in the position which they occupy during the retrieving cycle, following the initial motion of the pick-up member to working position;

Fig. 7 is a fragmentary side elevational view showing the line engaging finger of the pick-up member in engagement with the line, the finger being shown in solid lines in the forward position of its oscillation across the spool and in broken lines in the rearward position of said oscillation;

Fig. 8 is an enlarged fragmentary sectional view showing the cam face of the pick-up actuator in relationship to the pick-up member, before the crank is turned to retrieve line;

Fig. 9 is a view similar to Fig. 8 showing the relative position of parts during a retrieving cycle;

Fig. 10 is an exploded plan view of the device, partly in section, showing the carrier member and shaft removed from the reel casing for change of spools;

Fig. 11 is a section taken as indicated along the line 11—11 of Fig. 10;

Fig. 12 is an enlarged, fragmentary side elevational view, partially in section, of the pick-up finger;

Fig. 13 is a fragmentary enlarged front elevational view of the finger;

Fig. 14 is a central longitudinal sectional view of a reel casing having a modified brake mechanism;

Fig. 15 is a fragmentary front elevational view of said casing;

Fig. 16 is a section taken as indicated along the line 16—16 of Fig. 14;

Fig. 17 is a section taken as indicated along the line 17—17 of Fig. 15; and

Figs. 18 and 19 are fragmentary sectional views, enlarged, of two modifications of the spool rear wall margin.

Referring to the drawings in greater detail, and referring first to Figs. 1 and 10, a spinning reel has a base 15 upon which is a leg 16 to support a casing 17 which has on one side an external boss 18 to provide a bearing for a hand crank 19 having a shaft 20 upon the inner end of which is a spiral drive gear 21. Ordinarily the reel is hung beneath the rod so that the hand crank 19 may be manipulated with the left hand and the right used for casting. The casing has a flat front plate 22 provided with an integral internal hollow boss 22a which surrounds an opening in the front wall in which a bushing 23 is removably mounted.

A tubular shaft 24 is mounted within the bushing and has an integral carrier plate 25 at its forward end. A thrust bearing 24a lies between the bushing 23 and the plate 25, and a retaining ring 24b abuts the rear of the shaft 24. Extending through the tubular shaft 24 and through an aperture in the carrier plate 25 is a slidable spindle 26 which has at its rear end a spiral spur gear 27 meshed with the spiral drive gear 21 on the shaft 20, and which has at its forward end a fixed crank plate 28.

At the rear of the slidable spindle 26, between the hollow shaft 24 and the spiral gear 27, is a compression spring 29 which serves to urge the slidable spindle 26 rearwardly. As best seen in Fig. 10, the bushing 23 has an annular groove 30 adjacent its rear end to receive the inner end of a set screw 31 which is mounted in a shallow boss 32 in the side of the casing 17 opposite the hand crank 19, so as to hold the assembly including the bushing 23, hollow shaft 24 and slidable spindle 26 in place in the casing 17, and to permit them to be removed from the casing as a unit, as shown in Fig. 10. A curved shoulder 32a at the rear of the boss 32 prevents the line from fouling under the head of the screw 31 in case a loop of line should fall behind the screw. A line receiving spool 33 is journaled on the bushing 23 between the casing 17 and the carrier plate 25, and has front and rear peripheral flanges 33a and 33b, respectively, which overlie the adjacent portions of the reel to prevent fouling of the line on the spool spindle.

Referring now to Figs. 2–6, and first to Fig. 3, the crank plate 28 on the end of the slidable spindle 26 is provided with an eccentric pin 34 on which is mounted an oscillating actuator member 35 which has a central arcuate slot 36 concentric with the pin 34 to accommodate the sliding spindle 26. At one end the actuator member 35 has a cam portion 37 which has an undercut cam face 38 (Figs. 8 and 9) adjacent an open slot 39 in the actuator 35. A forwardly projecting pin 40 on the carrier member 25 engages a U-shaped slot 41 in the end of the actuator member 35 opposite said cam portion 37 which, together with the eccentric pin 34, determines the swing of the actuator member. A pin 42 projects rearwardly from the actuator member 35 to engage an arcuate slot 43 in the carrier member 25 which has one of its ends 43a much closer to the shaft 26 than its opposite end 43b (see Fig. 4). Thus, as the actuator member 35 swings about the pivot 34 counterclockwise from the full line position of Fig. 2 to the dotted line position of Fig. 2, the pin 42 moves from the inner end 43a to the outer end 43b of the slot 43.

Referring particularly to Fig. 4, the carrier member 25 is provided with a bearing block 44 which has a bearing opening 44a disposed as a chord of the circle formed by the carrier member 25, and which has a generally radially extending abutment face 44b; and mounted in the bearing opening is a line pick-up member, indicated generally at 45, which has a mounting portion 46 slidably and rotatably supported in the bearing block, a line engaging finger portion 47 which is generally concentric with the margin of the carrier member 25, and a crank portion 48 which extends toward the spindle 26 from the bearing block and projects forwardly from the carrier member 25 as best seen in Fig. 1. As seen in Figs. 12 and 13, the finger 47 has a shoulder 47a at its outer end, and a tungsten carbide tip 47b which is perfectly smooth so as to avoid all chance of snagging the line. The shoulder 47a prevents line from sliding off the tip and riding up the finger. A leaf spring 49 is pinned to the carrier member 25 at 50 and extends beneath the crank portion 48 of the pick-up member 45 to urge said crank portion away from the carrier member and into the open slot 39 in the actuator 35. A removable cover member 51 is secured to the carrier member 25 so as to enclose the operating mechanism just described and provide a fingerpiece of circular outline which is smaller in diameter than the pool. The cover member is provided with an opening through which the mounting portion 46 of the pick-up member 45 projects so that the line engaging finger 47 lies outside said cover member.

The mechanism as thus far described operates as follows: Assuming that a cast has just been made, the line engaging finger 47 is in the retracted solid line position of Fig. 2, as is the finger operating mechanism. As the hand crank 19 is rotated to retrieve line, it drives through the spiral drive gear 21 and the spiral spur gear 27 to rotate the spindle 26 and the crank plate 28 clockwise as indicated by the arrow on plate 28 in Fig. 2. The crank pin 34 which is engaged with the actuator member 35 drives the actuator member which in turn drives the carrier member 25 by reason of the engagement between the pin 40 and the slot 41. Thus, the entire assembly of the crank plate 28, actuator member 35 and carrier member 25 begins to rotate clockwise as a unit. This continues until the pin 42 on the actuator member 35 strikes a lug 52 on the forward end of the bushing 23, which may be assumed to be in the downwardly projecting position shown in Fig. 2. When the pin 42 strikes the lug 52 the lost motion connection between the actuator member 35 and the carrier member 25 permits the carrier member to continue rotating while the actuator member is stopped by the lug. Thus, the crank plate 28 and carrier 25 continue to rotate clockwise, while actuator 35 stops, producing relative rotation between carrier 25 and actuator 35 with the latter moving counterclockwise relative to the former. This relative movement takes place about pin 40 as a pivot, and is indicated in Fig. 2 by the arrow on actuator 35. The relative rotation of said two members drives the crank portion 48 of the line pick-up member 45 against the right hand marginal portion 39a of the open notch 39 which slides the pick-up member bodily in the bearing block 44 until the crank portion 48 strikes the abutment surface 44b, at which time the continuing motion of the carrier member 25 relative to the actuator member 35 drives the crank portion 48 beneath the undercut cam face 38 of the actuator member so as to rock the crank portion of the pick-up member against the resilience of the spring 49 and swing the line engaging finger 47 to the full line position shown in Figs. 6 and 7 (broken lines of Fig. 2). During the relative movement of actuator 35 and carrier 25, slots 36 in the actuator traverses spindle 26 and pin 42 on the actuator traverses slot 43 in the carrier from inner end 43a to outer end 43b (Fig. 4), as shown by comparison of the full and broken line positions of the actuator in Fig. 2, or comparison of Fig. 2 and Fig. 6. This eccentric movement of actuator 35 with respect to spindle 26, about pin 41 as a pivot, carries pin 42 outwardly over the end of lug 52; and thereafter the carrier member 25 and the actuator member 35 rotate as a unit without angular displacement. In the course of the first revolution of the carrier member the line engaging finger 47 of the pick-up member engages the line L and commences to wind it around the spool 33.

Assuming the line L to be fully wound on the spool, in order to prepare to cast the index finger is placed against the cover member 51 while the crank 19 is reversely rotated a few degrees; or alternatively the crank is held still and the cover moved a few degrees by forefinger pressure. This again causes relative movement between the carrier member 25 and the actuator 35 which moves the lever portion 48 of the line pick-up out from under the inclined cam face 38 so that the leaf spring 49 may return it to its position in the open slot 39, whereupon the left hand marginal portion 39b of the slot 39 strikes the crank portion 48 to slide the pick-up member in the bearing block and return it to its retracted position in which the line engaging finger 47 is below the rim of the spool 33. This brings the line to a position between the forefinger and the cover member 51 where it may be controlled preparatory to casting.

As indicated in Fig. 7, the line engaging finger 47 oscillates across the surface of the spool 33 to cross wind the line L, and this movement is accomplished by sliding the spindle 26 axially against the compression spring 29 so as to move the actuator 35 in and out with respect to the carrier member 25 and the line pick-up member 45. The axial movement of the spindle 26 is produced by an oscillator assembly, indicated generally at 53, which includes an eccentric pin 54 on the drive gear 21 on which is mounted a crank arm 55 the outer end of which is pivotally connected at 56 to an oscillator 57 which is pivotally supported on a pin 58 and has at its free end a pusher pad 59 which engages the rear of the spindle 26. Thus, as the hand crank 19 is turned the action of the oscillator assembly 53 plus the thrust of the rear spring 29 reciprocates the spindle 26 axially as shown by the broken lines in Fig. 1. In addition to the action of the spring 29, the normal thrust of the spiral drive gear 21 on the spiral spur gear 27 tends to urge the spindle 26 rearwardly. The area of engagement between the drive gear 21 and the spur gear 27 is sufficient to keep said gears in driving engagement in spite of the relative movement between them which is produced by the axial reciprocation of the spindle 26.

The driving pressure between the drive gear 21 and the spur gear 27 in combination with the compression spring 29, is also employed in connection with the retraction of the line pick-up member 45 when it is desired to make a cast. It sometimes happens when the crank 19 is reversely rotated while the cover member 51 is held against rotation that the lug 52 is in the path of the pin 42 on the actuator member 35. However, the reverse thrust on the spur gear 27 is sufficient to compress the spring 29 more than is accomplished in the ordinary axial reciprocation of the spindle 26, the gear thrust serving to move the crank plate 28 and actuator member 35 far enough forward that the pin 42 may pass over the front of the lug 52.

As best seen in Fig. 1, the reel is also provided with an automatic anti-reverse which consists of a swinging arm 60 which is pivoted on the drive shaft 20 between the bearing boss 18 and the drive gear 21 and has a roller 62 at its free end. The casing 17 has an arcuate inner surface 63 adjacent the swinging arm 60 and the shaft 20 is parallel to the arcuate surface 63 and is eccentric with respect to the center of curvature of said surface. When the crank 19 is being rotated to retrieve line, frictional engagement between the gear 21 and the swinging arm 60 carries the arm upwardly against the boss 22a (dotted line position of Figure 1), but reverse rotation causes the swinging arm 60 to rock downwardly to the full line position of Fig. 1 where the roller 62 jams between the arcuate surface 63 of the casing and the teeth of the drive gear 21 to prevent fourther reverse rotation. This permits the reel to be used when trolling without holding the hand crank, and is also useful in playing a fish that is taking out line. The anti-reverse does not interfere with retraction of the line pick-up finger 47, previously described, because retraction is complete before the anti-reverse can swing far enough to lock.

Referring now generally to Figs. 10 and 11, the brake mechanism for the reel 33 is mounted in a boss 64 on the casing in front of the bearing boss 18 and includes a hollow screw 65 having a knurled head through which extends a slidable brake stem 66 having an enlarged end portion 67 which is adapted to bear upon a face of the spool 33, there being a compression spring 68 between the hollow screw 65 and the enlarged end portion 67 of the brake stem. Thus, the brake tension may be adjusted by means of the screw 65.

Turning now to the modified form of spinning reel illustrated in Figs. 14 to 17, inclusive, and giving equivalent parts reference numerals 100 numbers higher than those used in Figs. 1 to 13, a casing 117 has an external boss 118 which provides a bearing for a hand crank. Since the operating mechanism in the modified form is identical with that in the preferred form except for the brake means, the elements other than the casing and brake means will not be described herein. The casing has a flat front plate 122 provided with an integral hollow boss 122a to receive a spindle 123 for a carrier assembly, on which spindle is journaled a spool 133 which is substantially identical with the spool used in the preferred form. The rear peripheral flange 133b may be slightly wider than the flange 33b to accommodate the brake mechanism which lies at the front of the casing. The casing 117 has a thickened side wall portion 132 which acts as an internal boss to receive a locking screw 131 for the carrier assembly. An external shoulder 132a surrounds the rear portion of the head of the locking screw to prevent fouling of the line under the screw head.

Turning now to a description of the brake mechanism and referring first to Fig. 15, a flexible brake support plate 170 is secured to one side of the front face 122 of the casing by means of a pair of screws 171 and extends across the front face, being provided with a central aperture 172 which embraces the spindle 123 of the carrier assembly. A shallow upturned rim 173 on the front of the brake support plate 170 is slightly arched along its straight marginal portions 174 to provide greater stiffness; and a fiber brake shoe 175 is secured to the front of the support plate 170 by the mounting screws 171. The brake shoe 175 is thicker than any part of the flange 173, and extends substantially to a line tangent with the rim of the opening 172 which is farthest from the screws 171. A marginal opening 176 in the fiber brake shoe accommodates the spindle for the carrier assembly.

As seen in Fig. 17 the brake support plate 170 and fiber shoe 175 lie in the recess which is formed by the rear peripheral flange 133b of the spool 133. Braking is accomplished by the frictional drag of the fiber shoe 175 on the rear face of the spool 133. Changes in brake pressure are accomplished by means of a brake adjusting screw 177 which extends longitudinally through the lower portion of the casing and has a knurled head 178 at the rear of the casing where it is readily accessible. The screw 177 bears against the extreme free marginal portion of the plate 170, so that tightening the screw increases the frictional drag of the shoe 175 on the back of the spool 133 in the area at the two sides of the aperture 176 which surrounds the spindle 123. As a result of the foregoing brake construction, the frictional drag is applied at the central area of the spool so that it does not tend to rock the spool on the spindle.

The modified form of spool 233 shown in Fig. 18 has a rear peripheral flange 233b in the forward portion of which is a continuous recess 233c into which the tip 47a of a pick-up finger 47 may extend at the rearmost point of its traverse across the spool. This provides a positive pick-up for the line, which can not slide around the end of the finger 47.

In the modified spool shown in Fig. 19, the spool is pressed out of sheet metal and has a rear peripheral flange 333b which is doubled back to provide a forwardly extending line retaining flange 333c which serves substantially the same function as the groove 233c in the form of Fig. 18.

The foregoing detailed description is given for clearness of understanding only and no unnecessary limitations are to be understood therefrom, as some modifications will be obvious to those skilled in the art.

I claim:

1. A fishing reel comprising: a casing having an arcuate inner surface; crank actuated drive means in said casing including a crank shaft parallel to said surface and eccentric with respect to the center of curvature thereof and a drive gear on said shaft; an anti-reverse arm on said crank shaft which may swing free of said surface on rotation of said shaft in one direction and swing into jamming engagement with said surface and said gear on reverse rotation of the crank shaft; a spool forward of the casing, said spool having an axial opening and line retrieving and guiding means forward of the spool and operatively connected to said drive means through the axial opening in the spool to retrieve line on rotation of said shaft in said one direction, said line retrieving and guiding means including a line pick-up finger and mechanism for swinging said finger to a retracted position on reverse rotation of the crank shaft prior to jamming of said anti-reverse arm.

2. A fishing reel comprising: a casing having an aperture in its front wall; crank actuated drive means in said casing; a rotatable sleeve extending through said aperture; a spool with a circular rim, said spool having an axial opening surrounding said sleeve, the sleeve being rotatable independently of the spool; a carrier member on the front of said sleeve; a line pick-up member movably mounted on said carrier member, said member including a pick-up finger which moves between a retracted position below the rim of the spool and a working position above said rim; a spindle slidably mounted in said sleeve for rotation by said drive means, said spindle having a rotor plate at its outer end; an actuator member eccentrically mounted on said rotor plate and making a lost motion engagement with said carrier member to move said pick-up finger between retracted and working positions upon initiation of rotation of said rotor to retrieve line, said actuator member having a portion for rocking said pick-up member to swing said finger across the face of the spool as rotation continues; and means linked with the drive means for reciprocating said spindle axially to continually swing said finger during rotation of the drive means.

3. A fishing reel comprising: a casing; crank actuated drive means in said casing including a spiral drive gear; a longitudinally slidable spindle extending through the front of the casing and having a spiral gear engaging said drive gear so that the thrust of said gears during line retrieving urges said spindle rearwardly; lever means bearing on the rear of said spindle and linked to said drive gear for rocking movement to reciprocate said spindle axially; a spool with a circular rim, said spool having an axial opening surrounding the spindle ahead of the casing, said spindle being rotatable independently of the spool; carrier means journaled on said spindle ahead of the spool; a line pick-up finger mounted on said carrier means for oscillatory movement across said spool; pick-up actuating means mounted on the outer end of the spindle to oscillate said finger upon reciprocation of said shaft; and means for retracting the pick-up finger to a position below the rim of the spool.

4. A fishing reel comprising: a casing having an opening in its front wall; a bushing removably mounted in said opening, said bushing having a laterally projecting lug at its forward end; shaft means in said bushing including a hollow shaft rotatable in the bushing and a spindle rotatable in the hollow shaft; a spool journaled on said bushing in front of the casing; a carrier plate on the front of the hollow shaft and having a bearing block thereon; a line pick-up member mounted for rocking and sliding movement in said bearing block, said member including a crank portion adapted to be rocked with reference to the carrier plate; a leaf spring urging the crank portion away from the plate; a crank plate on the spindle forward of the carrier plate, said crank plate having a crank pin; an actuator member pivoted on said pin and making a driving connection with said carrier plate at one end, said actuator having a rearwardly projecting control pin on the opposite side of the crank pin from said driving connection, said control pin extending through a slot in the carrier plate so that rocking the actuator member about the eccentric pin moves said control pin in the slot laterally with reference to the spindle, said control pin being adapted to strike said lug on the bushing except when the pin is in its outer position, said actuator having an open notch in which the crank portion of the pick-up member is positioned and having an inclined cam surface adapted to override said crank portion; driving means in the casing for rotating said spindle, said driving means including a hand crank; and means linked to said driving means for axially reciprocating the spindle to move said actuator in and out and rock said pick-up member across the spool.

5. The device of claim 4 in which the driving means includes a spiral drive gear and a spiral gear on the spindle meshing with the drive gear so that rotation of the gears to retrieve line urges the spindle rearwardly and reverse rotation urges the spindle forwardly so that the control pin may pass in front of the lug.

6. The device of claim 4 in which the driving means includes a drive gear meshing with a spiral gear on the spindle, and the means for axially reciprocating the spindle includes an eccentric on the drive gear, a lever bearing on the rear of the spindle, a crank connecting the eccentric to the lever, and a spring urging the spindle rearwardly.

7. A fishing reel comprising: a casing; hand crank means mounted in the casing which includes a spiral drive gear; a spindle slidably supported in the front wall of the casing and having a spiral gear meshing with said drive gear so that movement of the hand crank to retrieve line thrusts the spindle rearwardly while reverse rotation thrusts it forwardly; a compression spring urging the spindle rearwardly; lever means linked to the drive gear to reciprocate the spindle longitudinally; a spool with a circular rim, said spool having an axial opening surrounding the spindle in front of the casing, said spindle being rotatable independently of the spool; carrier means rotatably mounted on the spindle in front of the spool; a line pick-up member mounted on the carrier means for movement between a retracted position below the rim of the spool and a working position above said rim; and means for moving said pick-up member between said two positions and for oscillating said pick-up member in response to longitudinal movement of said spindle.

8. A fishing reel comprising: a casing; crank actuated drive mechanism in said casing including a rotatable spindle projecting through the front of the casing; a spool with a circular rim, said spool having an axial opening surrounding said spindle, the spindle being rotatable independently of the spool; carrier means on the spindle ahead of said spool; a line pick-up member movably mounted on said carrier means, said member including a pick-up finger which moves between a retracted position below the rim of the spool and a working position above said rim, said finger being the only part of the reel forward of the spool which extends laterally above said rim; pick-up actuating means movably mounted at the front of said spindle and rotatable conjointly with said carrier means, said actuating means making a lost motion connection with the carrier means and having a portion engageable with the pick-up member to move the pick-up finger between said positions upon relative movement between said means; and means operatively connecting the actuating means to the drive mechanism to rock the pick-up member on the carrier means and oscillate the pick-up finger across the spool as the carrier means and pick-up member are rotated to retrieve line.

9. A fishing reel comprising: a casing; crank actuated drive mechanism in said casing including a rotatable spindle projecting through the front of the casing; a spool with a circular rim, said spool having an axial opening surrounding said spindle, the spindle being rotatable independently of the spool; carrier means on the spindle ahead of said spool; a line pick-up member movably mounted on said carrier means, said member including a pick-up finger which moves between a retracted position below the rim of the spool and a working position above said rim; pick-up actuating means movably mounted at the front of said spindle eccentrically with respect to the carrier means, said actuating means being rotatable conjointly with said carrier means; a pin on the actuating means which projects through a slot in the carrier means to provide a lost motion connection between the actuating means and the carrier means, said pin being movable in the slot so as to be laterally displaced with respect to the spindle upon relative movement between the actuating means and the carrier means; pick-up member engaging means on the actuating means which is engageable with the pick-up member to move the pick-up finger between said positions upon said relative movement; a relatively fixed lug supported behind the carrier means in such a position that said pin may strike said lug except when the pin is in its most laterally displaced position; and means linked to the drive mechanism for oscillating the pick-up member across the spool as the carrier means and pick-up member are rotated to retrieve line.

10. The device of claim 9 in which the spindle has a crank plate at its outer end provided with an eccentric pin upon which the actuating means is mounted.

11. A fishing reel comprising: a casing; crank actuated drive mechanism in said casing including a rotatable spindle projecting through the front of the casing; a spool with a circular rim, said spool having an axial opening surrounding said spindle, the spindle being rotatable independently of the spool; carrier means on the spindle ahead of said spool; a bearing block mounted on the carrier means; a line pick-up member having a mounting portion slidably and rotatably mounted in said bearing block and a pick-up finger which moves between a retracted position below the rim of the spool and a working position above said rim; pick-up actuating means movably mounted at the front of said spindle and rotatable conjointly with said carrier means, said actuating means making a lost motion connection with the carrier means and having a portion engageable with the pick-up member to move the pick-up finger between said positions upon relative movement between said means; and means linked to the drive mechanism for oscillating the pick-up finger across the spool as the carrier means and pick-up member are rotated to retrieve line.

12. The device of claim 11 in which the actuating means has an abutment portion which slides the finger in the bearing block and a cam face which rotates the finger in the block.

13. A fishing reel comprising: a casing; crank actuated drive mechanism in said casing including a rotatable spindle projecting through the front of the casing which has a small spiral gear at its rear end and a large spiral gear meshing with said small spiral gear; a spool with a circular rim, said spool having an axial opening surrounding said spindle, the spindle being rotatable independently of the spool; carrier means on the spindle ahead of said spool; a line pick-up member movably mounted on said carrier means, said member including a pick-up finger which moves between a retracted position below the rim of the spool and a working position above said rim; pick-up actuating means movably mounted at the front of said spindle and rotatable conjointly with said carrier means, said actuating means making a lost motion connection with the carrier means and having a portion engageable with the pick-up member to move the pick-up finger between said positions upon relative movement between said means; and means for oscillating the pick-up finger across the spool including a crank eccentrically mounted on the large spiral gear, and a lever pivoted in the casing and linked to said crank, said lever having a free end in surface abutting engagement with the rear end of said spindle to urge the spindle forward, said spindle being urged rearward by the thrust action of said spiral gears.

14. A fishing reel comprising: a casing; a bushing removably mounted in the front of the casing; crank actuated drive mechanism in said casing including a rotatable spindle in said bushing which projects through the front of the casing, there being a spiral gear at the rear of said spindle which has a diameter less than the outside diameter of the bushing so that the bushing and spindle may be removed from the casing as a unit; movable latch means for retaining said bushing in place; a spool journalled on said bushing, said spool having a circular rim; carrier means on the spindle ahead of said spool; a line pick-up member movably mounted on said carrier means, said member including a pick-up finger which moves between a retracted position below the rim of the spool and a working position above said rim; pick-up actuating means movably mounted at the front of said spindle and rotatable conjointly with said carrier means, said actuating means making a lost motion connection with the carrier means and having a portion engageable with the pick-up member to move the pick-up finger between said positions upon relative movement between said means; and means linked to the drive mechanism for oscillating the pick-up member across the spool as the carrier means and pick-up member are rotated to retrieve line.

15. In a spinning type fishing reel: a rotatable carrier member; a line pick-up member movably mounted on said carrier member; actuating means mounted on an axis which is eccentric to said carrier member, said actuating means having a positive driving connection with said carrier member at one side of said axis to rotate the carrier member, and a lost motion connection therewith on the opposite side of said axis adjacent said pick-up member so that it may swing about said axis to move said pick-up member with respect to the carrier member while rotating the carrier member; manual means for rotating the actuating means; and means causing said actuating means to swing about said axis at a point in its rotation, said actuating means being releasable from said last named means at a predetermined point in said swing.

16. A fishing reel comprising: a casing; a spindle extending through the front of the casing; hand crank means journalled on the casing for rotating said spindle; a line carrying spool surrounding the spindle in front of the casing, said spool having a circular front rim; circular carrier means on the spindle in front of the spool, said carrier means being of smaller diameter than the rim of the spool, and said carrier means and spool being rotatable relative to each other to retrieve line; a line pick-up member movably mounted on said carrier means, said member including a pick-up finger of arcuate form which moves between a retracted position generally concentric with the circular carrier means and wholly below the spool rim and a working position above said rim, said finger being the only part of the reel forward of the spool which extends laterally above said rim; and means including a cup-shaped finger piece positioned forward of the carrier means for moving the pick-up finger to retracted position when manual finger pressure is exerted upon said finger piece, said finger piece being only slightly smaller than the rim of the spool.

17. The device of claim 16 in which the spool has a forwardly extending peripheral lip which surrounds the rear of the carrier means to prevent fouling of line behind the carrier means.

References Cited in the file of this patent

UNITED STATES PATENTS

| | | |
|---|---|---|
| 138,881 | Gladney | May 13, 1873 |
| 279,304 | Wythe | June 12, 1883 |
| 1,987,713 | Scott | Jan. 15, 1935 |
| 2,507,457 | Rix | May 9, 1940 |
| 2,521,543 | Shakespeare et al | Sept. 5, 1950 |
| 2,600,558 | Mauborgne | June 17, 1952 |
| 2,613,468 | Hand | Oct. 14, 1952 |
| 2,632,608 | Vincent | Mar. 24, 1953 |
| 2,644,647 | Denison et al. | July 7, 1953 |
| 2,649,258 | Shelburne | Aug. 18, 1953 |
| 2,652,990 | Ferguson | Sept. 22, 1953 |
| 2,668,024 | Campbell | Feb. 2, 1954 |
| 2,670,908 | Hill | Mar. 2, 1954 |
| 2,690,309 | Cuonz | Sept. 28, 1954 |
| 2,724,563 | Shakespeare et al, | Nov. 22, 1955 |

FOREIGN PATENTS

| | | |
|---|---|---|
| 889,493 | France | Oct. 4, 1943 |